(No Model.)
W. N. WHITELEY.
HARVESTER TRUCK.
No. 368,437. Patented Aug. 16, 1887.
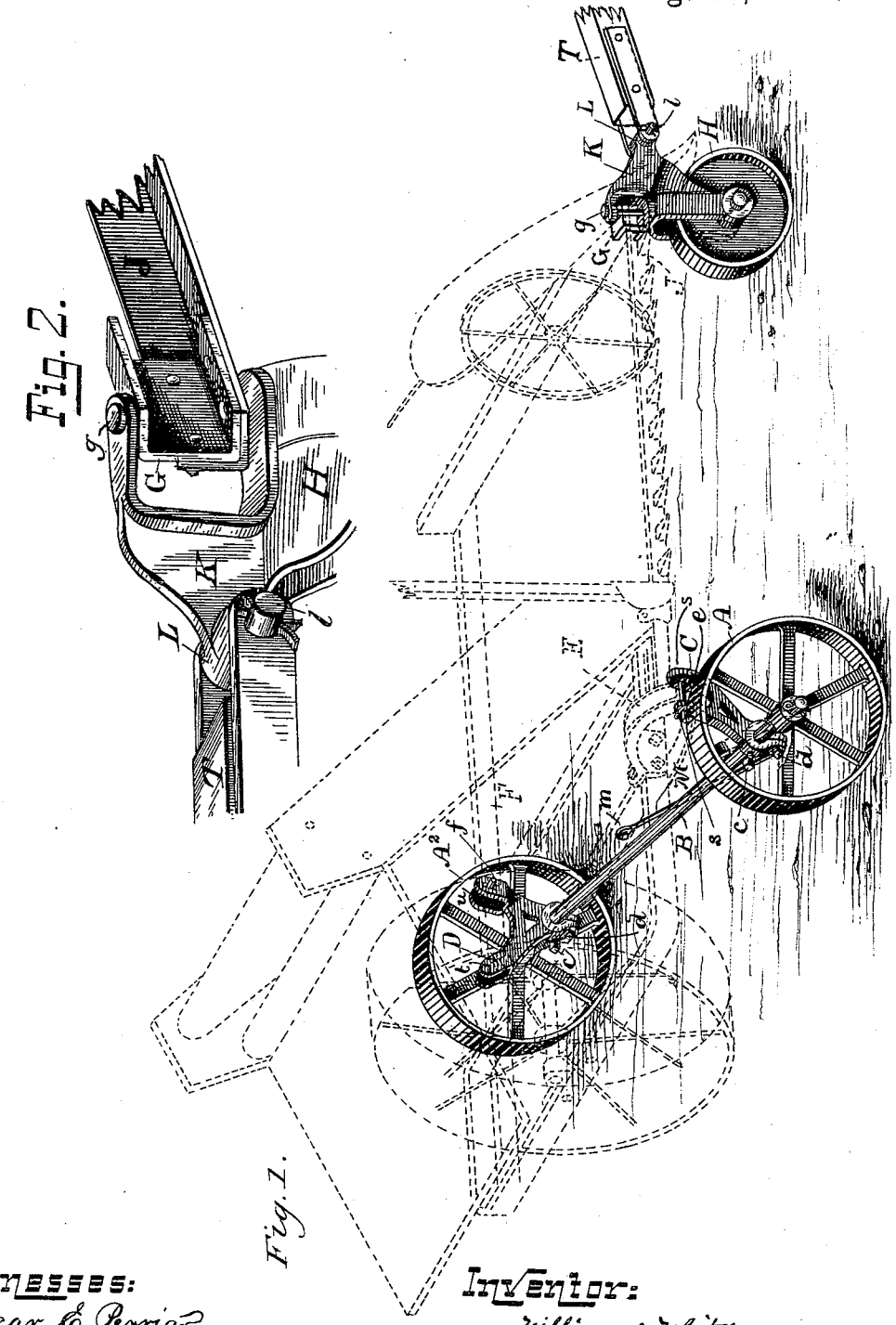
Witnesses:
Oscar E. Perrigo
A. S. Perrigo
Inventor:
William N. Whitely

UNITED STATES PATENT OFFICE.

WILLIAM N. WHITELEY, OF SPRINGFIELD, OHIO.

HARVESTER-TRUCK.

SPECIFICATION forming part of Letters Patent No. 368,437, dated August 16, 1887.

Application filed March 21, 1887. Serial No. 231,694. (No model.)

*To all whom it may concern:*

Be it known that I, WILLIAM N. WHITELEY, a citizen of the United States, residing in the city of Springfield, county of Clark, and State of Ohio, have invented a new and useful Improvement in Grain-Harvesting Machinery—namely, a Harvester-Truck—of which the following is such a full, clear, and exact description thereof as will enable any person skilled in the art to construct and use the same, reference being had to the accompanying drawings, forming a part of this specification.

My invention relates to harvesting machinery generally, and particularly to devices for transporting the same.

It consists in a truck of new and novel form and construction for the purpose of placing the same under a grain-binding harvester when it is desirable to move it on the road farther than it would be advisable to do upon its own wheels.

In the drawings, Figure 1 is a perspective view of my improved truck, showing it in place, the harvester being represented in dotted lines; and Fig. 2 is a perspective view, on an enlarged scale, of the back of the bracket attached to the outer end of the finger-bar to form a pivot for the caster-wheel bracket, a part of which is shown.

Similar letters refer to like parts in both views.

A and $A^2$ are two truck-wheels of any convenient form, pivoted upon the ends of an axle, B, upon which are fixed two upward-projecting brackets, C D. These brackets fit the axle, and are split beneath it and confined by clamp-bolts $d$ $d$, and further secured to said axle by the set-screws $c$ $c$.

The bracket C is divided at the top, forming two ears, $r$ $s$, which embrace the draft-tongue bracket E of the harvester, (the draft-tongue T having been previously removed,) and is secured thereto by a bolt, $e$, similar to the one with which the draft-tongue was pivoted.

The bracket D is formed with two arms, $t$ $u$, properly connected, the upper ends of the arms having slots formed therein, which embrace the rear sill, F, of the harvester, as shown, and secured in that position by a pin, $f$. By this device the principal weight of the machine is supported upon two wheels, A $A^3$, the parts of the truck being made perfectly rigid and strong by means of the brace M, extending from the lower end of the bracket C to any convenient point on the harvester-frame at $m$. The finger-bar J is of the usual form of angle-iron in common use for this purpose, the cross-section form being shown in Fig. 2.

Upon the outer end of the finger-bar J is permanently fixed a bracket, G. (Shown on an enlarged scale in Fig. 2.) A caster-wheel, H, is pivoted in the bracket K, the top of which is so formed as to fit upon the bracket G, and is pivoted thereto by the vertical bolt $g$, which passes through the hole $h$ in the bracket G. Upon the bracket K is formed a forwardly-projecting portion, L, horizontally perforated for the tongue-bolt $l$, by which the draft-tongue T is pivoted thereto, the same as it is usually pivoted to the draft-tongue bracket E. The machine, therefore, is supported at three points by the brackets C, D, and K, and upon the ground by the three wheels A, $A^2$, and H. The draft-tongue and the truck K being attached to the outer end of the cutting apparatus causes the line of draft to pass diagonally across the machine, and for that reason the axle B is conveniently placed obliquely to the cutting apparatus, as shown.

It is usual in devices of this kind employing three wheels to construct a triangular frame, one of whose sides is the axle upon which the large wheels are pivoted, while a caster-wheel is pivoted at the apex of the triangle and the draft-tongue attached at that point. Another method is to provide three wheels, each being pivoted in a separate bracket and independently attached to some convenient part of the harvester. I prefer the method I have described and illustrated as superior to either of the other methods in strength, compactness, and convenience.

Having thus described my invention, its construction and use, what I claim is—

A harvester-transporting truck comprising an axle having at its ends the two principal carrying and supporting wheels A and $A^2$, brackets C D, rigidly attached to said axle near its ends, respectively, said brackets being adapted at their upper ends to receive, hold, and support the frame of the harvester at its front and rear sides, respectively, near to the main driving-wheel, a leading-truck having a wheel, H, and a bracket, K, adapted to be pivotally attached to the extremity of the finger-bar of the harvester, and means for attaching the draft-tongue, substantially as set forth.

WILLIAM N. WHITELEY.

Witnesses:
OSCAR E. PERRIGO,
A. S. PERRIGO.